United States Patent
Lerner et al.

(10) Patent No.: US 8,951,684 B2
(45) Date of Patent: Feb. 10, 2015

(54) CONTROL DETECTION METHOD TO ENABLE GAS COMPOSITION OBSERVING DURING FUEL CELL SYSTEM STARTUP

(75) Inventors: Seth E. Lerner, Honeoye Falls, NY (US); Akbar Chowdhury, Pittsford, NY (US); Steven G. Goebel, Victor, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 938 days.

(21) Appl. No.: 12/703,309

(22) Filed: Feb. 10, 2010

(65) Prior Publication Data

US 2011/0086283 A1    Apr. 14, 2011

Related U.S. Application Data

(60) Provisional application No. 61/249,872, filed on Oct. 8, 2009.

(51) Int. Cl.
*H01M 8/04* (2006.01)

(52) U.S. Cl.
CPC ...... *H01M 8/04223* (2013.01); *H01M 8/04388* (2013.01); *H01M 8/04753* (2013.01); *Y02E 60/50* (2013.01)
USPC ........................................................ 429/429

(58) Field of Classification Search
USPC ........................................................ 429/429
See application file for complete search history.

(56) References Cited

U.S. PATENT DOCUMENTS

| | | | |
|---|---|---|---|
| 2002/0076582 A1* | 6/2002 | Reiser et al. | 429/13 |
| 2007/0243426 A1* | 10/2007 | Bono | 429/13 |
| 2008/0081225 A1 | 4/2008 | Arthur et al. | |
| 2008/0187804 A1 | 8/2008 | Arthur et al. | |
| 2010/0190075 A1 | 7/2010 | Frost et al. | |

OTHER PUBLICATIONS

B. W. Bequette. Process control: modeling, design, and simulation, Pearson Education, 2003, partial Chapters 1 and 5.*

* cited by examiner

*Primary Examiner* — Carlos Barcena
(74) *Attorney, Agent, or Firm* — Dinsmore & Shohl LLP (57) ABSTRACT

A detection method for enabling gas composition observation during fuel cell system start-up is described. In one embodiment, the method includes initiating a flow of hydrogen to the anode to pressurize the anode; opening an anode flow valve; determining if an anode pressure exceeds an anode pressure threshold; enabling anode flow set point detection after a first predetermined time if the anode pressure exceeds the anode pressure threshold; monitoring an anode flow set point using the anode flow set point detection; determining if the anode flow set point exceeds an anode flow set point threshold; and closing the anode flow valve after a second predetermined time if the anode flow set point exceeds the anode flow set point threshold.

20 Claims, 8 Drawing Sheets

CONTROL DETECTION METHOD TO ENABLE GAS COMPOSITION OBSERVING DURING FUEL CELL SYSTEM STARTUP

CROSS-REFERENCE TO RELATED APPLICATIONS

This application claims the benefit of U.S. Provisional Application Ser. No. 61/249,872, filed Oct. 8, 2009.

BACKGROUND OF THE INVENTION

The invention relates generally to fuel cell systems, and more particularly to methods of starting fuel cell systems.

Starting a fuel cell system for automotive applications involves a balance between reliability, durability, and time until acceptable drive away (start length). Reliability involves ensuring that sufficient reactant is present across the whole active area on both sides of the membrane so that full current can be supported This must be done without exceeding the hydrogen emission requirements. Factors such as hardware layout, hardware reliability, or cold ambient conditions also impact the strategy used to start a fuel cell system successfully.

Durability involves proper mitigation of the Air/$H_2$ front on the anode. Correlations between Air/$H_2$ front speed through the cell, and cell degradation have been identified. In order to reduce the effect of cell degradation, the front speed must be increased. However, in automotive applications, increasing the front speed is limited by the hydrogen emission requirements.

In all cases, it is desirable to reduce the start length for customer satisfaction. Again, this is limited by the hydrogen emission requirements and the ability to supply reactant fully and uniformly to the stack active area due to its non-uniform flow characteristics.

In a normal start, concern for reliability, durability, and start length are about the same. In a typical start strategy, the initial gas composition within the system is required as an input to the controls so that the system can decide on the most optimized method to start.

Figure 1:
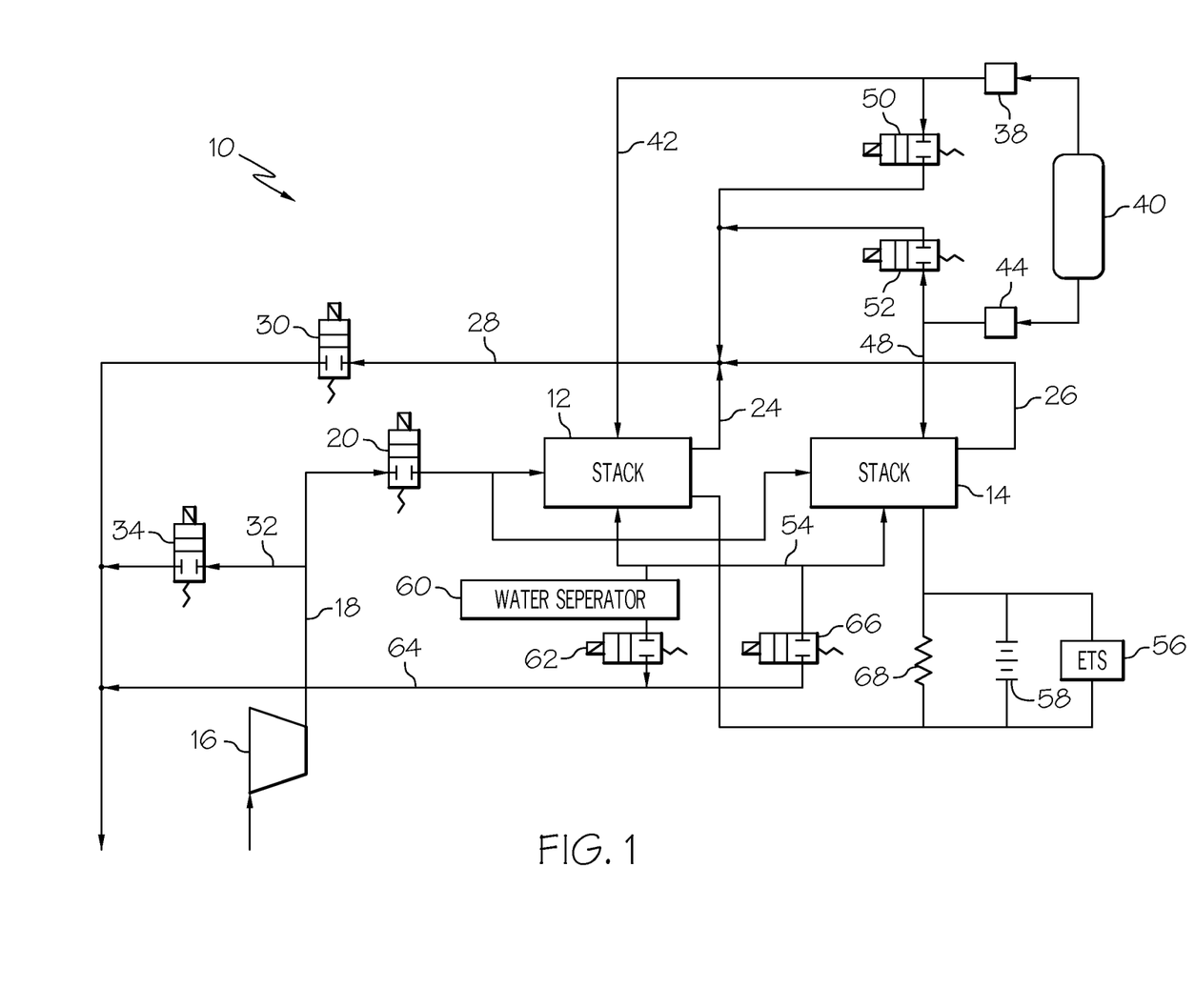
FIG. 1 is a schematic block diagram of a fuel cell.
Figure 2A:
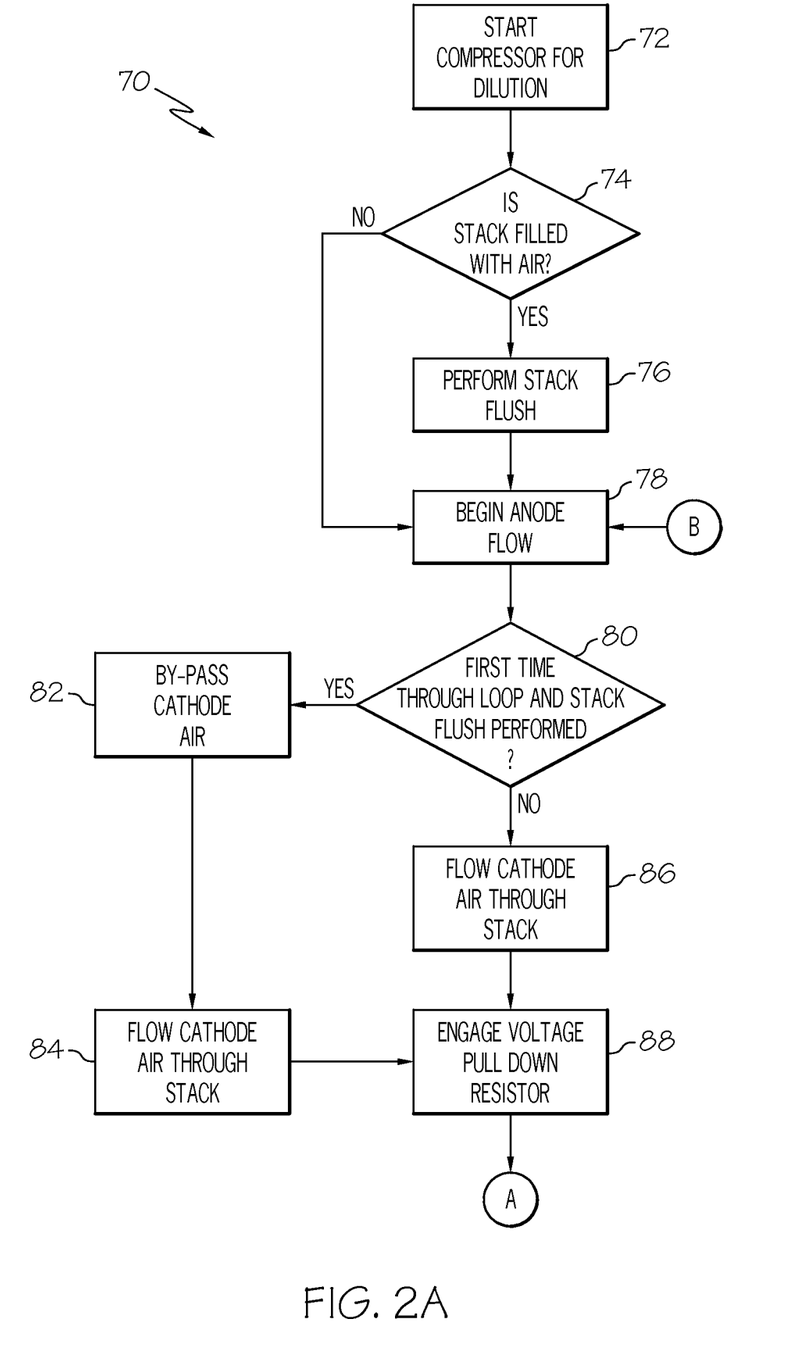
FIGS. 2A-B are flow chart diagrams showing a process for providing a normal fuel cell start-up.
Figure 2B:
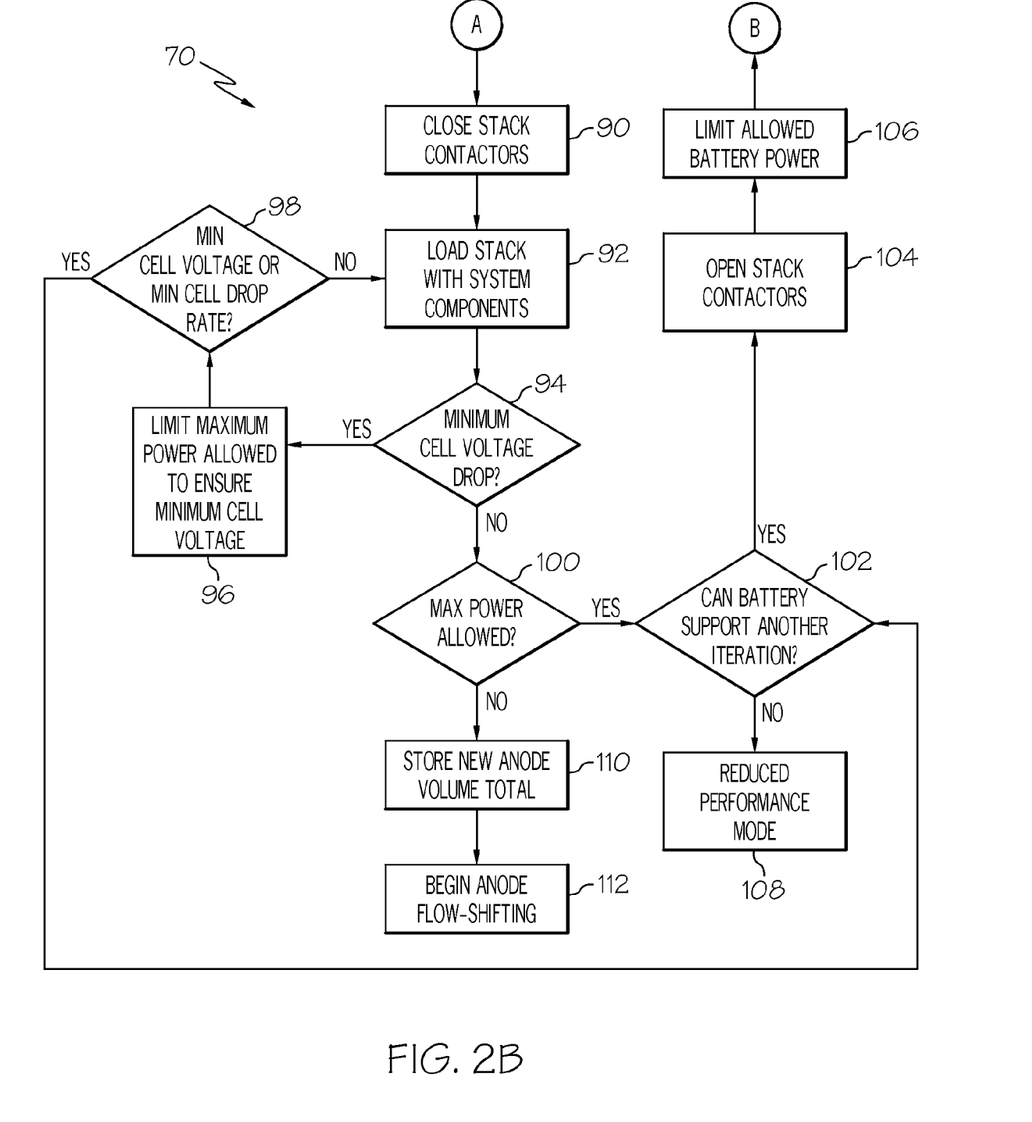

FIGS. 1-2 illustrate one embodiment of a fuel cell system and a normal start-up method. The system and method are described more fully in U.S. application Ser. No. 11/859,300, filed Sep. 21, 2007, entitled Method for Fast and Reliable Fuel Cell Systems Start-ups, which is incorporated herein by reference. Many other embodiments are possible.

FIG. 1 shows a fuel cell system 10 including a first split fuel cell stack 12 and a second split fuel cell stack 14. A compressor 16 provides cathode input air on cathode input line 18 to the stacks 12 and 14 through a normally closed cathode input valve 20. Cathode exhaust gas is output from the split stack 12 on line 24, and cathode exhaust gas is output from the split stack 14 on line 26 where the cathode exhaust gas is combined into a single cathode output line 28. A normally closed cathode back pressure valve 30 controls the flow of the cathode exhaust gas through the line 28. A cathode by-pass line 32 between the input line 18 and the output line 28 allows the cathode input air to by-pass the stacks 12 and 14. A normally closed by-pass valve 34 controls whether the cathode air by-passes the stacks 12 and 14. If the valves 20 and 30 are closed and the valve 34 is open, air from the compressor 16 will by-pass the stacks 12 and 14. Typically, a cathode humidification unit (not shown) will be provided at a suitable location in the cathode input line 18.

In this arrangement, the stacks 12 and 14 employ anode flow-shifting where the anode reactant gas flows back and forth through the stacks 12 and 14 at a predetermined cycle in a manner that is well understood to those skilled in the art. An injector 38 injects hydrogen gas from a hydrogen gas source 40 through anode line 42 to the split stack 12, and an injector 44 injects hydrogen gas from the hydrogen source 40 through anode line 48 to the split stack 14 in an alternating sequence. A connector line 54 connects the anode sides of the stacks 12 and 14.

A water separator 60 is coupled to the connector line 54 and collects water in the anode gas flow between the stacks 12 and 14. A normally closed drain valve 62 can be employed that is periodically opened to vent the water to the cathode exhaust gas line 28 on line 64. Further, an anode exhaust gas purge valve 66 can be provided in the connection line 54.

As discussed above, it is desirable to bleed the anode side of the stacks 12 and 14 periodically to remove nitrogen that may otherwise dilute the hydrogen and affect cell performance. Normally closed bleed valves 50 and 52 are provided for this purpose. When an anode bleed is commanded, the bleed valve 50 or 52 is opened, and the bled anode exhaust gas is sent to the cathode exhaust gas line 28 depending on which direction the hydrogen gas is currently flowing. Particularly, if the hydrogen gas is being injected into the split stack 12 from the source 40 when a bleed is triggered, then the bleed valve 52 is opened Likewise, if the hydrogen gas is being injected into the split stack 14 from the source 40 when a bleed is triggered, then the bleed valve 50 is opened. The flow-shifting will typically occur several times during a normal bleed duration so that the bleed valves 50 and 52 have to be opened and closed several times in time with the flow switching.

The fuel cell stacks 12 and 14 generate current. During normal stack operation, the current generated by the stacks 12 and 14 is used to drive system loads, such as an electrical traction system (ETS) 56 on a vehicle. During a shut-down sequence, the current generated by the stacks 12 and 14 may be used to charge a battery 58, or be dissipated by other system components, and then be dissipated by a resistor 68.

At one system shut-down sequence, the compressor 16 is stopped, and the valves 20 and 30 are closed to seal the cathode side of the stacks 12 and 14. The flow of hydrogen is continued so that any remaining oxygen in the stacks 12 and 14 is consumed. The current generated by the stacks 12 and 14 is sent to the to the battery 58. When the stack power decreases to another predetermined level, the contactors are opened, and the stack load is switched to the resistor 68. Particularly, once the voltage has degraded to a fixed cut-off voltage, the stack load is switched to the resistor 68. The cut-off voltage could be the lower limit of a DC/DC converter (not shown), or the lower limit of a power device. The objective of the battery load is to consume and/or store any energy that otherwise would have been wasted. It also reduces the energy consumption requirements of the resistor load.

Once the oxygen has been consumed from the stacks 12 and 14, the hydrogen flow is turned off, and the valves 50, 52, 62 and 66 are closed to seal the anode side of the stacks 12 and 14. When the system 10 is shut-down in this manner, the stacks 12 and 14 include an $N_2/H_2$ mixture in both the cathode side and the anode side. Over time, air will leak into the stacks 12 and 14, and the hydrogen in the stacks 12 and 14 will initially consume the oxygen. Additionally, the hydrogen will slowly leak out of the stacks 12 and 14. As a result, the composition of the gases within the stacks 12 and 14 will vary over time between a hydrogen rich mixture in nitrogen and water to an air mixture.

The amount of hydrogen that is used at startup to purge the stacks 12 and 14 can be calculated based on the volume of the anode side of the stacks 12 and 14, the temperature of the stacks 12 and 14, and the pressure within the stacks 12 and 14. The hydrogen flow into the stacks 12 and 14 should be roughly one anode volume. If an insufficient amount of hydrogen flows into the stack, some of the fuel cells might be left containing an $H_2/O_2$ front. If too much hydrogen flows into the first stack, excess hydrogen is wasted to the exhaust and might enter into the second stack through compression, leading to a stagnant hydrogen/air front causing excessive voltage degradation. The loop volume for each of the stacks 12 and 14 is calculated and this information is combined with the hydrogen flow rate during the start-up to determine the purge time for the first stack.

FIGS. 2A-B is a flow chart diagram 70 showing a method for starting the fuel cell system 10 quickly and reliably, especially during cold starts. At box 72, the compressor 16 is started for hydrogen output dilution purposes. The initial part of the system start-up includes starting the compressor 16 to provide dilution air for hydrogen that collects in the exhaust as a result of the start-up sequence. The algorithm then determines whether the stacks 12 and 14 are filled with air at decision diamond 74 as a result of the time they have been shut-down, and if so, initiates a flush of the anode headers using a header purge at box 76. This provides a technique for removing air and nitrogen from the header of both of the stacks 12 and 14 prior to the stack flush. After the header has been purged, the stack flush provides a large flow rate of hydrogen gas through the anode flow fields to minimize start-up degradation due to the hydrogen/air front, as discussed above.

The algorithm then continues the anode flow by opening the drain valve 62 to the stacks 12 and 14 simultaneously to continue filling the anode header flow channels with hydrogen gas at box 78. In this flow process, both of the injectors 38 and 44 are used at the same time to flow hydrogen gas evenly through the stacks 12 and 14. All large valves are closed at this stage to allow for a well controlled, low flow rate hydrogen injection. The valves that are open typically have a small orifice. Alternatively, large valves can be used that are pulse width modulated to provide effectively a small valve. The hydrogen injectors 38 and 44 are typically controlled based on the anode outlet pressure of the stacks 12 and 14. However, in this case, the injectors 38 and 44 will switch modes to flow control where the flow will be metered so that it is as high as possible without causing exhaust emissions to exceed a predetermined hydrogen concentration when mixed with the cathode exhaust. Therefore, the hydrogen flow rate would be varied in real time based on cathode dilution flow.

If the stack is not filled with air at the decision diamond 74, then the algorithm skips the stack flush step at the box 76, and proceeds directly to the step of providing the anode flow at the box 78.

At the same time, there should be a peak anode pressure to limit the injector flow 38 and 44. In other words, the cathode exhaust flow rate needs to be known, and the anode flow rate will be estimated based on the injector duty cycle. The injectors 38 and 44 should be controlled so as to generate as high a flow as possible to produce emissions less than the predetermined threshold, and so that anode pressures do not exceed a predetermined pressure, such as 150 kPa. The duration of this flow is determined based on a function that takes the time since the last shut-down as the input, and outputs a minimum number of anode volumes of hydrogen gas that should be flowed.

The algorithm then determines whether this is the first time through the start loop and the anode side flush was performed at decision diamond 80. If both of these conditions are met, then the algorithm by-passes the cathode air around the stacks 12 and 14 for some duration of the anode flow, such as half, at box 82. When by-passing the cathode air around the stacks 12 and 14, additional air is not added to the cathode side that may permeate through the membranes. In other words, it is desirable to fill the anode side completely with hydrogen before air is introduced into the cathode side so that hydrogen permeates through the membrane instead of air, reducing the hydrogen/air front on the anode side of the stacks 12 and 14.

Once the cathode air has by-passed the stacks 12 and 14 for the predetermined anode volume flow, the algorithm then flows the cathode air through the stacks 12 and 14 for the remainder of the anode flow at box 84. If this is not the first time through the control loop or the stack flush did not occur at the box 76, then the algorithm proceeds directly to flowing the cathode air through the stacks 12 and 14 at box 86.

Next, the algorithm continues with the anode flow and engages the pull-down resistor 68 coupled to the stacks 12 and 14 as a load at box 88 until one of two conditions is met, namely, that the minimum cell voltage is greater than a predetermined voltage value, such as 700 mV, or a predetermined period of time has elapsed, such as 10 seconds. By putting a load on the stacks 12 and 14, a voltage drop occurs across the stacks 12 and 14 that more nearly matches the high voltage bus line (not shown) coupled to the high voltage battery 58 in the system 10. Particularly, the algorithm uses a stack voltage response to apply a load to assess if hydrogen and oxygen are being sufficiently distributed to all of the fuel cells by coupling an auxiliary load to the fuel cell stack. This step is one of the ways that the algorithm provides a fast and reliable start-up by making sure that the minimum cell voltage is high enough or enough hydrogen is in the anode flow channels so that the operation of the stacks 12 and 14 is stable. If the stacks 12 and 14 are healthy, and no problems exist, then the algorithm will proceed very quickly through these steps of the control loop. However, if the stacks 12 and 14 have significantly aged, or degraded for some other reason, then the time period that the algorithm waits during the start-up sequence will provide a better situation for the stacks 12 and 14 to start in a stable manner.

Once the minimum cell voltage is greater than the predetermined voltage value or the predetermined time period has expired, the algorithm then closes the stack contactors to the high voltage bus line at box 90 to allow the stacks 12 and 14 to operate under the normal loads of the system 10. The algorithm then loads the stacks 12 and 14 at box 92 with as many of the fuel cell system components as it can up to the maximum limit of the stacks 12 and 14 for a predetermined period of time, typically about 1 to about 2 seconds, although it could be up to 7 seconds or more, to test the stacks 12 and 14 and see if they will operate normally.

The algorithm then determines whether the minimum cell voltage has dropped to a predetermined voltage, such as 400 mV, at decision diamond 94. If the minimum cell voltage in either of the stacks 12 or 14 is below the predetermined voltage, then the reliability of the start-up is reduced. The algorithm then proceeds to minimize the maximum power allowed to be drawn from the stacks 12 and 14 at box 96 in an attempt to try and raise the minimum cell voltage above the predetermined value.

The algorithm also determines whether the minimum cell voltage has dropped below another lower predetermined voltage, such as 200 mV, or the minimum cell voltage drop rate is exceeding a predetermined voltage drop rate, such as 1000 mV/sec, at decision diamond 98. If neither of these two conditions is met, then the algorithm returns to the box 92 to give the stacks 12 and 14 another attempt to raise their minimum cell voltage above the first predetermined voltage value.

If the minimum cell voltage is not less than the first predetermined voltage value at the decision diamond 94, then the split stack 12 or 14 may be operating properly. The algorithm then determines whether the maximum power allowed from the stacks 12 and 14 is less than a predetermined value, such as 90 kW, at decision diamond 100. If the maximum stack power is below the predetermined value, then the stacks 12 and 14 have not raised their maximum power output quickly enough during the start-up sequence, meaning that the stacks 12 and/or 14 may be unstable.

If the minimum cell voltage is less than the second predetermined voltage value or the minimum cell voltage drop rate is greater than the predetermined voltage drop rate at the decision diamond 98, or the stacks 12 and 14 have not reached the maximum power allowed at the decision diamond 100, then the algorithm determines whether the battery 58 can support another loop through the start-up sequence at decision diamond 102. If there is sufficient battery power and the number of iterations through the loop has been less than a predetermined value, such as eight, then the stack contactors are opened at box 104. Further, the algorithm limits the maximum power draw from the battery 58 to some predetermined maximum value, such as 20 kW, or to the maximum battery power available, whichever is smaller, at box 106. The algorithm then proceeds to the step of providing the anode flow to the stacks 12 and 14 at the box 78, where the answer to whether this is the first time through the loop at the decision diamond 80 will be no, increasing the number of performed iterations through the loop.

If the battery 58 cannot support another iteration through the loop or the maximum number of iterations through the loop has been reached at the decision diamond 102, then the system 10 is put in a reduced performance mode at box 108 that allows the vehicle to operate, but with limited power, so that it can be driven to a service station or other safe location.

If the maximum power allowed is greater than the predetermined value at the decision diamond 100, then the algorithm modifies the look-up table that identifies how many anode volumes of hydrogen have been flowed into the anode flow field at box 110. If the amount of anode flow needed is higher, then the table is updated permanently in the software for the system. In this way, the start time may be extended in the future for the new times since the last shut-down, but the reliability of the system is improved. Essentially, the table will adapt as the stack ages. Once the table is updated, the algorithm will go to full system operation and begin anode flow-shifting at box 112.

The successful startup of a fuel cell system requires that hydrogen be present at the active area of the anode at the time current is drawn. Air must also be present at the cathode active area. When the FCS exists in an off state and hydrogen is not actively controlled, nitrogen and air will gradually enter into the anode. Thus, to ensure that hydrogen is available at the activation sites for current draw, the nitrogen and air must be purged from the anode system during start.

As discussed above, one current method to remove nitrogen and air from the anode is a function known as Anode Flush. When done properly, the hydrogen replaces the existing gas in the system. This operation is intended to be performed quickly and the gas to be flowed uniformly. However, the ideal case is usually not achievable due to hardware constraints such as non-uniform flow and hydrogen exhaust requirements.

The Anode Flush method purges air and nitrogen from the sub-stacks during the start sequence. Hydrogen enters the stack from the injector unit into the bottom of the header. An Anode Flush is typically done to provide a simultaneous flow of hydrogen to all the cells after a complete header purge. The anode valve opens and allows the hydrogen to flow through the stack, thus effectively purging non reactants from the flow fields. Hydrogen fills the bottom portion of the stack. In some cases where there is a poor header purge, it can reach the anode valve before it reaches the top cells. Due to the limited dilution available in the exhaust and the high anode flow rate, the anode valve must be closed before the hydrogen concentration through the valve goes too high. However, the anode may not be fully purged at this point.

Therefore, there is a need for a start-up method which has an improved flush function.

SUMMARY OF THE INVENTION

A detection method for enabling gas composition observation during fuel cell system start-up is described. In one embodiment, the method includes initiating a flow of hydrogen to the anode to pressurize the anode; opening an anode flow valve; determining if an anode pressure exceeds an anode pressure threshold; enabling anode flow set point detection after a first predetermined time if the anode pressure exceeds the anode pressure threshold; monitoring an anode flow set point using the anode flow set point detection; determining if the anode flow set point exceeds an anode flow set point threshold; and closing the anode flow valve after a second predetermined time if the anode flow set point exceeds the anode flow set point threshold.

DETAILED DESCRIPTION OF THE INVENTION

A detection method for enabling gas composition observation during fuel cell system start-up is described. The method is used to detect when to enable gas composition observation. The method identifies specific portions of the pressure response for the enabling criteria. One portion is the initial pressure up which involves a comparison of pressure feedback to the pressure set point. The anode pressure set point is predetermined based on testing and the system requirements. It is a desired pressure for the anode flush, which desirably is high but which is limited by emissions considerations. This helps to avoid false positives of gas composition detection. The testing for the anode pressure set point involves exercising the function and various different pressure set points to optimize for front speed and emission requirements. It involves setting different pressure set points and performing starts at various offtime values.

Another portion is a constant flow segment as indicated by the flat portion of the anode flow set point. This indicates that the pressure up is completed, and the gas concentration through the valve has not yet changed. The method also includes a boundary condition to protect against misdetections which could cause emissions violations. The boundary condition is a condition(s) outside of the normal operating limits of the fuel cell system. It is generally used to trigger some type of remedial action to prevent undesirable consequences. It ensures that if the gas composition detection malfunctions, the flush function will be ended in order to avoid emissions problems. It could be selected to be a time limit, a total volume of hydrogen added, or both, or some other operating condition, for example.

The method provides a more consistent and more complete flush compared to the current control method. It accounts for system to system variation. In addition, the calibration time is reduced over the volume count method, where the anode flush is performed for a certain number of anode volumes, e.g., one anode volume. When the fuel cell system is started with a stack that is partially filled with hydrogen or when the header purge does not result in cell to cell flows that are the same, emissions conditions could be exceeded, or there may be an inadequate fill. The gas composition detection provides feedback which can be used to address these problems.

The hydrogen concentration through an anode valve can be inferred from monitoring the anode pressure or flow response. This information can then be utilized to optimize the anode flush during start up. The system can tolerate only up to a certain hydrogen concentration at a given flow through the flush valve before the exhaust hydrogen emissions cannot be controlled for the amount of dilution air available in the exhaust. The correlation of concentration as inferred from the pressure flow response can then be used as the threshold to make control decisions. For example, U.S. application Ser. No. 12/361,042, filed Jan. 28, 2009, entitled System and Method for Observing Anode Fluid Composition During Fuel Cell System Start-Up, which is incorporated herein by reference, describes systems and methods for determining the composition of a fluid in the fuel cell system based on the analysis of a sensor signal.

The method provides an improved flush function. It incorporates a detection procedure that utilizes observation of gas concentration using pressure feedback. The feedback response must be handled correctly so that it does not cause false positives and so that it also recognizes the correct response to know when action should be taken.

Figure 3:
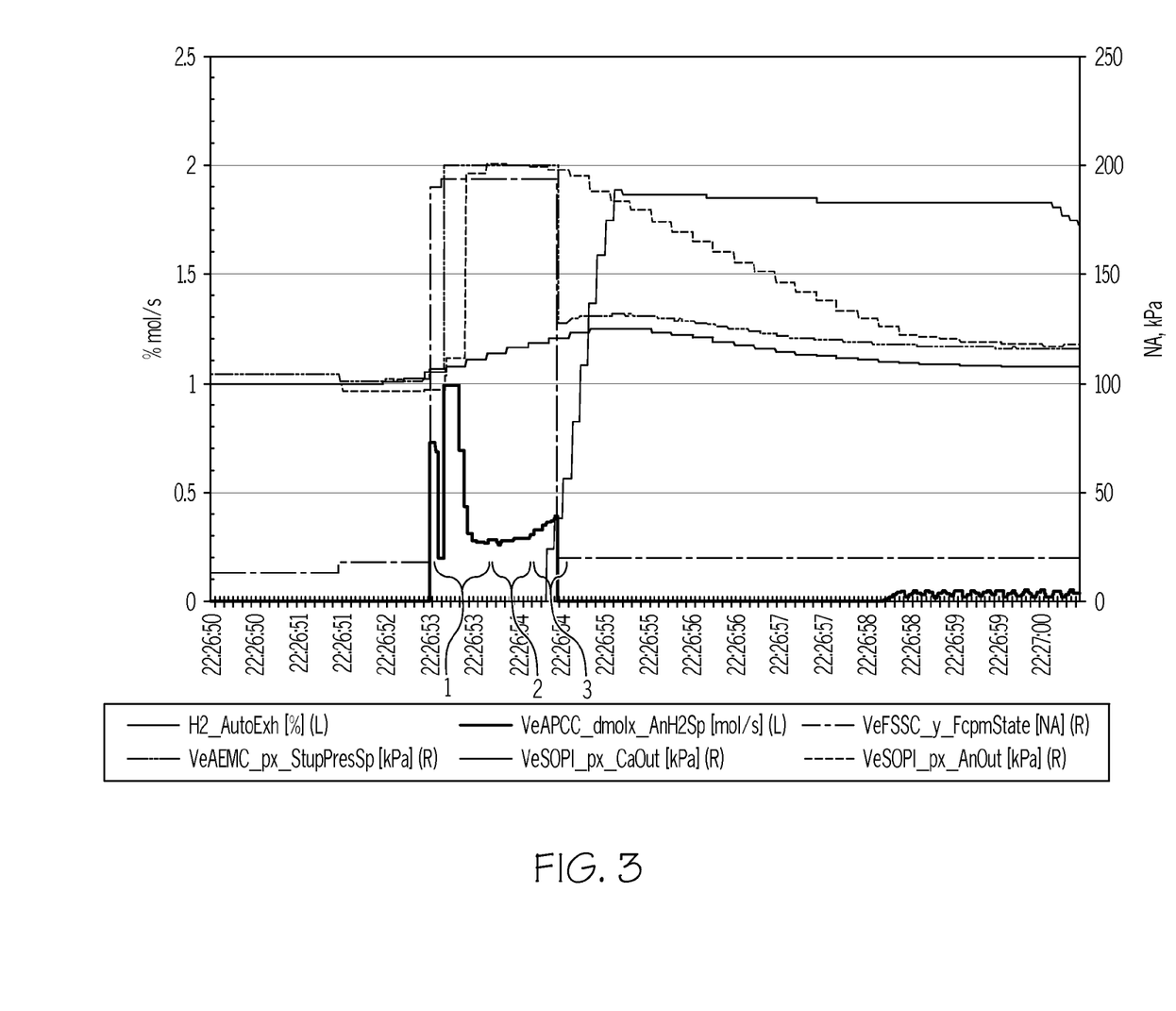
FIG. 3 is a graph showing the current Anode Flush without a prior header purge strategy.

FIG. 3 shows the current Anode Flush strategy. In the current method for Anode Flush, no detection is utilized. The function ends when the flush volume count exceeds a calibrated threshold. The calibration is typically very conservative due to system variations in order to prevent too much hydrogen entering into the exhaust. Typically, this results in a poor flush, which requires longer start lengths to allow for a complete flush using a lower flow rate.

The response of interest for the detection algorithm is the line designated by the signal name VeAPCC_dmol_AnH2Sp, which is the hydrogen flow rate set point which is used to calculate a duty cycle to transmit to the hydrogen injectors. There are three elements that need to be considered so that the detection algorithm does not generate false positives and so that it initiates the gas composition detection reliably. These elements have been grouped as indicated by brackets 1, 2, and 3. Bracket 1 is the initial pressurization of the anode where a high flow rate is generated. Desirably, it is the highest flow rate that is allowed by the physical constraints of the system limited by the maximum allowed anode pressure due to material limits and the size of the valve used for the flush. The high flow rate reduces the air/$H_2$ front resonance time. Bracket 2 is a transition point in which the gas composition through the anode valve is changing. It starts as mostly nitrogen or air and transitions to hydrogen as more hydrogen is introduced into the stack. Bracket 3 is the region where too much hydrogen is flowing through the valve, and it cannot be diluted in the exhaust to meet emissions requirements. It should be noted that as the hydrogen concentration through the valve increases, the hydrogen flow set point also increases to maintain the pressure set point. This response occurs due to the changing molecular weight of the gas composition through the valve as it transitions from air to hydrogen.

One embodiment of the method performs in the following way. When the Anode Flush function is enabled, the gas composition detection remains disabled during the portion of the response highlighted in bracket 1. This is controlled using the pressure feedback and comparing it to the pressure set point which would be a fixed value. Once the pressure feedback meets its set point, a time delay is introduced to ensure that a false positive is not triggered based on the flow set point signal (bracket 2). The time delay ensures that the gas composition detection is not enabled until a time relatively well into bracket 2. The gas composition detection is then enabled to monitor the flow set point. The gas composition detection takes action on the valve or ends the function when the flow set point exceeds a certain threshold. Also, to ensure that noise in the signal does not cause the gas composition detection to trigger prematurely, a time delay can be utilized to ensure that the flow set point has exceeded the flow set point threshold. This time delay would generally be a small value, on the order of about 100 milliseconds.

Figure 4:
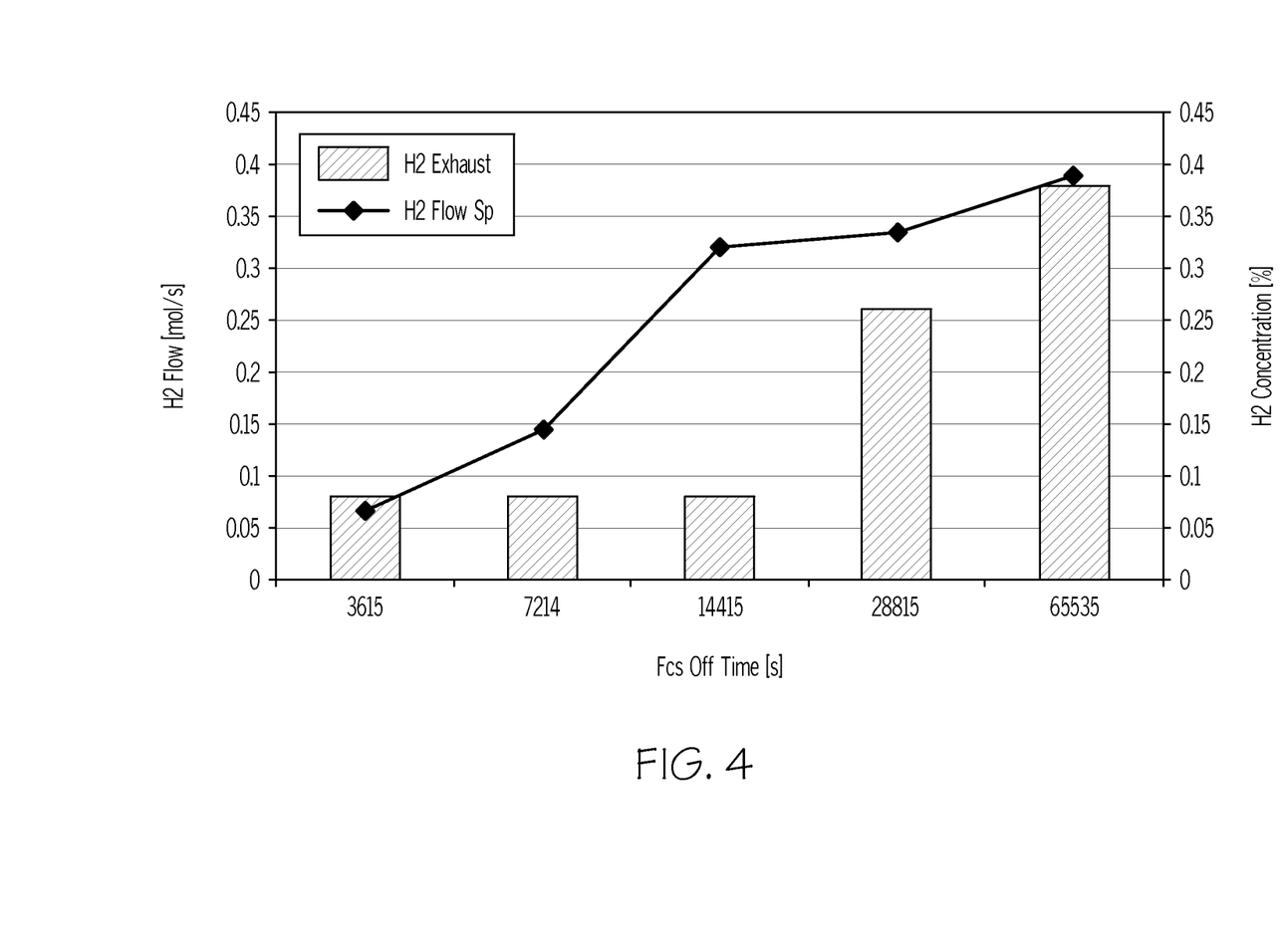
FIG. 4 is a graph showing hydrogen flow and hydrogen concentration as a function of the time the fuel cell system was off without a prior header purge.

The flow set point threshold is calibrated to optimize the anode flush so that the maximum amount of hydrogen has been introduced into the system without exceeding the exhaust concentration requirements. To determine when the flush should exit, a limit test is performed on the fuel cell system with an exhaust that closely matches vehicle exhaust. From the limit test, the exit threshold can be determined based on feedback from hydrogen sensors in the exhaust. As shown in FIG. 4, the flow set point threshold is a function of the initial gas composition at time of start request.

When there is a Header Purge step prior to the Anode Flush, the same detection method can be effective. However, it may require different calibrations. The response for Anode Flush with a prior Header Purge is shown in FIG. 5.

Figure 5:
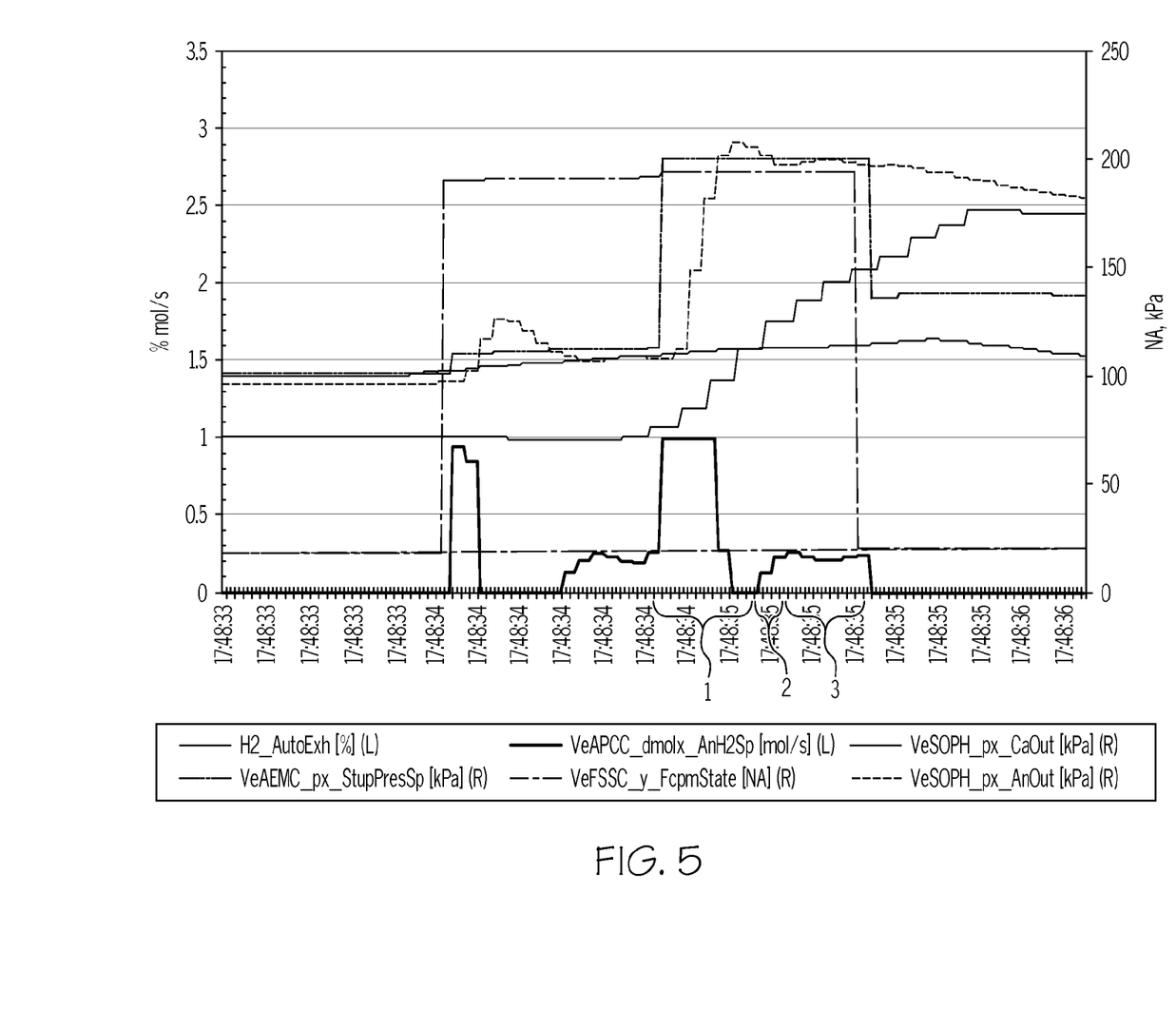
FIG. 5 is a graph showing an Anode Flush with a prior header purge strategy.

Although the flow set point response is not exactly the same for the case shown in FIG. 5, the three components needed for detection are still available. Adjustment for this condition can be built into the algorithm. For reference, FIG. 6 is the flow set point against fuel cell system off time (initial gas composition) at the end of the Anode Flush after Header Purge.

Figure 6:
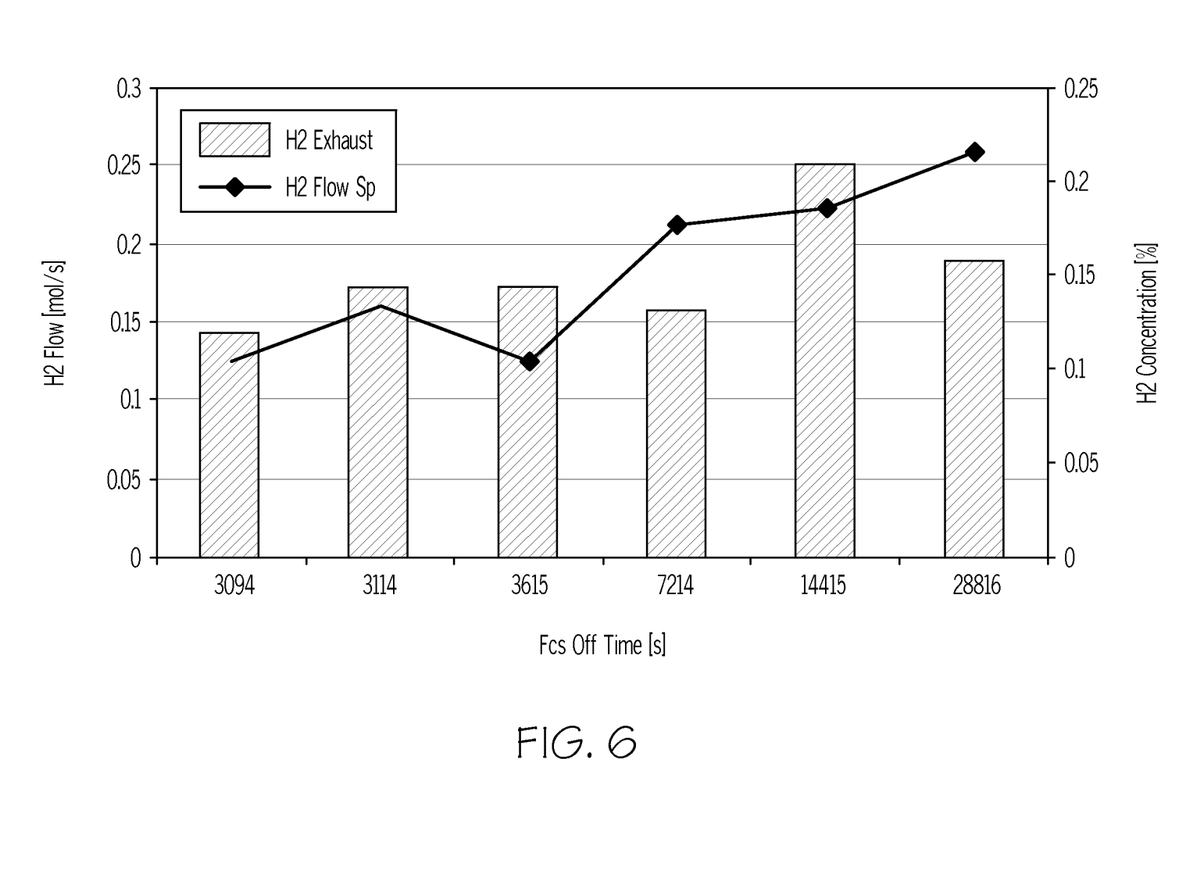
FIG. 6 is a graph showing hydrogen flow and hydrogen concentration as a function of the time the fuel cell system was off with a prior header purge.

As seen in FIG. 6, the $H_2$ flow at the end of the fast flush changes slightly with the off time value. This indicates various different levels of gas concentration through the valve at the end of the function. In the ideal situation, the concentration of hydrogen through the valve would be the same at the end of the function. However, emissions restrictions may prevent this if high levels of hydrogen are on the cathode, thus limiting the amount of anode hydrogen exhausted. The values in FIG. 6 are a good reference point to calibrate the flush threshold.

Figure 7:
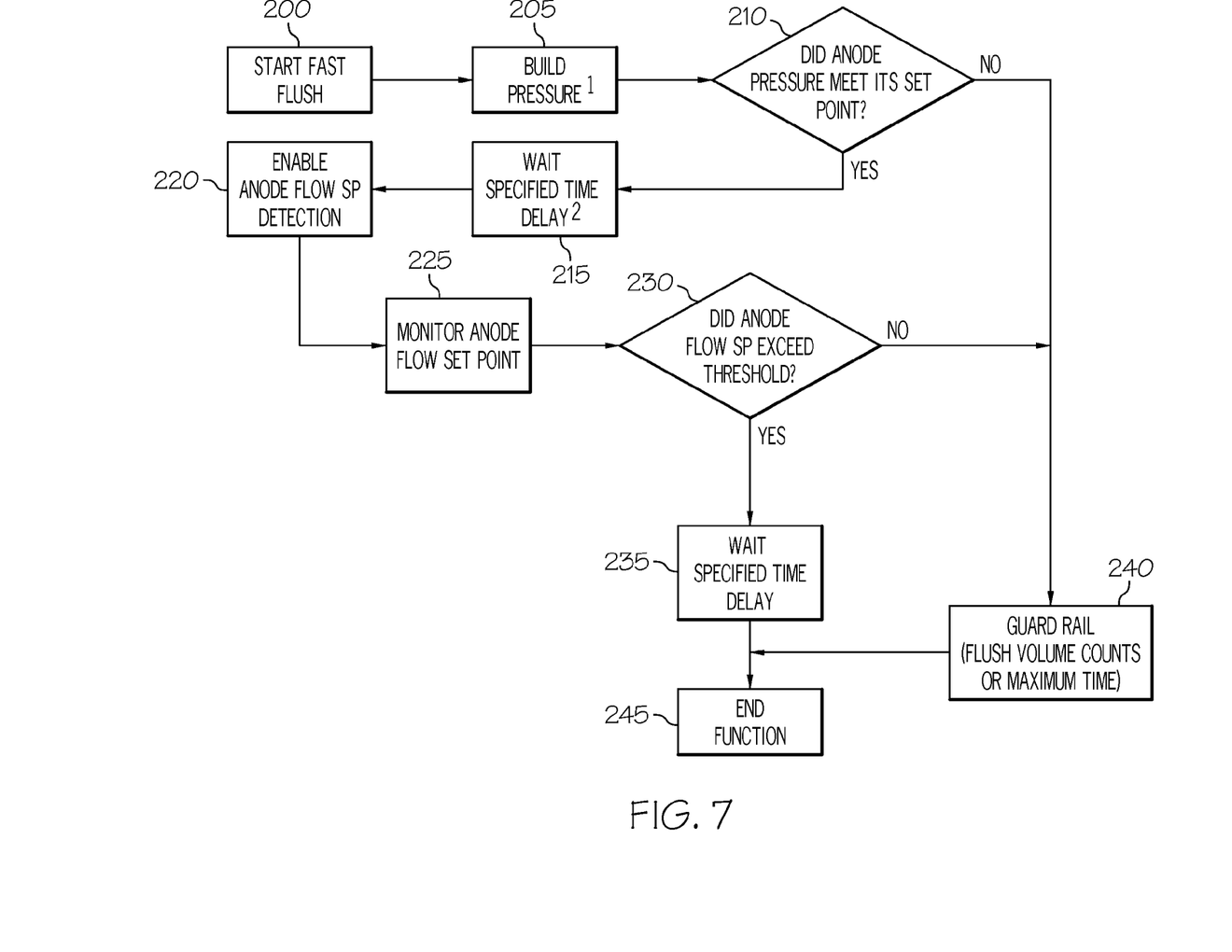
FIG. 7 is a flowchart showing a process for enabling gas composition observation.

FIG. 7 is a flow chart showing the process for enabling gas composition detection. The fast flush is started at block 200. This is followed by the pressure build at block 205. The pressure build is the anode side function to pressurize the anode such that a high flow rate will occur when the anode flow valve opens. Once the pressure achieves the set point, a flag is set indicating this portion of the function is completed.

At block 210, the system determines whether the anode pressure meets the anode pressure set point. The anode pressure set point threshold is generally in a range of about 140 to about 200 kPa. If the anode pressure set point was met, then the system waits for a predetermined length of time at block 215. The time delay is used to identify the "valley" between the pressure up portion and when steady flow is achieved. The time delay is determined by testing and the response of the signal being monitored. Ideally, it should be long enough that the ringing effect (the oscillation of the pressure signal around the setpoint) of the signal due to the pressure up has subsided. Emissions requirements are the main consideration for the time delay. A series of limit tests are performed in which the valve is intentionally held open for a time much longer than what is actually needed. The volume integrator reports how many anode volumes of hydrogen have been introduced into the anode. When the hydrogen sensors report a value such as 2.5%, the corresponding flush volume is used as a basis for calibration values. The limit test is performed at many different initial system conditions (e.g., various off time values and temperatures) in order to obtain the time delay. The time delay could also be identified by an algorithm that measures and calculates the slope of the signal. This would be a more complex implementation. The time delay is generally up to about 2 seconds.

After the time delay, the anode flow set point detection is enabled at block 220. The anode flow set point is monitored at block 225 to determine when the anode flow set point begins to increase to maintain pressure in the anode using a method such as the one described in U.S. application Ser. No. 12/361, 042. The anode flow set point is based on the error between the anode pressure and the anode pressure set point. The anode flow set point is a predetermined value. As the molecular weight changes from air (28.7) to hydrogen (2.0), the flow resistance decreases. Thus, to maintain the same pressure, the anode flow set point must increase. The gas concentration observation monitors the decrease in flow resistance using the pressure response via the anode flow set point. The anode flow set point threshold is generally in a range of about 0.1 to about 0.3 mol/s.

At block 230, the system determines whether the anode flow set point exceeds a threshold level. The threshold level is based on emission limits and can be determined using a method such as the one described in U.S. application Ser. No. 12/361,042. The threshold level for the anode valve set point is determined based on emissions limits. A PI (proportional integral) controller monitors the anode pressure setpoint v. the anode pressure feedback. It takes the error between the two signals and outputs a flow set point that commands the injectors such that the pressure set point is achieved. If the anode flow set point exceeds the threshold, the system waits for a predetermined time at block 235. The predetermined time is determined empirically. The fast flush function ends at block 245. The predetermined time is generally up to about 1 second, typically about 0.001 to about 1.0 sec.

If the anode flow set point did not exceed the threshold at block 230, the system proceeds to block 240 and waits until the boundary condition is exceeded. The boundary condition could be a flush volume threshold, a maximum time threshold, or both, or some other operating condition. The boundary condition time limit is generally up to about 2 seconds, typically about 0.25 to about 2 sec. The boundary condition volume of hydrogen is generally in a range of about 0 to about 10 anode volumes, typically about 0.25 to about 10 anode volumes (1/1). The fast flush function ends at block 245.

If the anode flow set point was not met at block 210, the system proceeds to block 240 and waits until the flush volume threshold or the maximum time threshold of the boundary condition is exceeded. The fast flush function ends at block 245.

The detection enable criteria could also be accomplished by monitoring the instantaneous derivative of the anode flow set point signal. The pressure up would show a steep positive slope. Once the pressure met its set point, the slope would show a steep negative slope followed by a flat or shallow slope. The algorithm could then identify these slopes in sequence and determine that the gas observation using the pressure sensor could be enabled.

Further, it is noted that recitations herein of a component of an embodiment being "configured" in a particular way or to embody a particular property, or function in a particular manner, are structural recitations as opposed to recitations of intended use. More specifically, the references herein to the manner in which a component is "configured" denotes an existing physical condition of the component and, as such, is to be taken as a definite recitation of the structural factors of the component.

It is noted that terms like "generally," "commonly," and "typically," when utilized herein, are not utilized to limit the scope of the claimed embodiments or to imply that certain features are critical, essential, or even important to the structure or function of the claimed embodiments. Rather, these terms are merely intended to identify particular aspects of an embodiment or to emphasize alternative or additional features that may or may not be utilized in a particular embodiment.

For the purposes of describing and defining embodiments herein it is noted that the terms "substantially," "significantly," and "approximately" are utilized herein to represent the inherent degree of uncertainty that may be attributed to any quantitative comparison, value, measurement, or other representation. The terms "substantially," "significantly," and "approximately" are also utilized herein to represent the degree by which a quantitative representation may vary from a stated reference without resulting in a change in the basic function of the subject matter at issue.

Having described embodiments of the present invention in detail, and by reference to specific embodiments thereof, it will be apparent that modifications and variations are possible without departing from the scope of the embodiments defined in the appended claims. More specifically, although some aspects of embodiments of the present invention are identified herein as preferred or particularly advantageous, it is contemplated that the embodiments of the present invention are not necessarily limited to these preferred aspects.

What is claimed is:

1. A detection method for enabling gas composition observation during fuel cell system start-up comprising:

initiating a flow of hydrogen to the anode to pressurize the anode and create a pressurized gas comprising hydrogen and other gases present in the anode at fuel cell system start-up;

monitoring an anode pressure;

opening an anode flow valve to release the pressurized gas in the anode in a fast flush;

determining if the anode pressure exceeded an anode pressure threshold;

enabling anode flow set point detection after a first predetermined time if the anode pressure exceeded the anode pressure threshold;

monitoring an anode flow set point using the anode flow set point detection;

determining if the anode flow set point exceeds an anode flow set point threshold; and closing the anode flow valve after a second predetermined time if the anode flow set point exceeds the anode flow set point threshold.

2. The method of claim 1 wherein the first predetermined time is up to about 2 sec.

3. The method of claim 1 wherein the second predetermined time is up to about 1 sec.

4. The method of claim 1 further comprising closing the anode flow valve when a boundary condition is exceeded if the anode pressure does not exceed the anode pressure threshold.

5. The method of claim 4 wherein the boundary condition comprises a third predetermined time.

6. The method of claim 4 wherein the boundary condition comprises an anode volume.

7. The method of claim 1 further comprising closing the anode flow valve when a boundary condition is exceeded if the anode flow set point does not exceed the anode flow set point threshold.

8. The method of claim 7 wherein the boundary condition comprises a third predetermined time.

9. The method of claim 7 wherein the boundary condition comprises an anode volume.

10. The method of claim 1 wherein the anode pressure threshold is in a range of about 140 to about 200 kPa.

11. The method of claim 1 wherein the anode flow set point threshold is in a range of about 0.1 to about 0.3 mol/s.

12. A detection method for enabling gas composition observation during fuel cell system start-up comprising:

initiating a flow of hydrogen to the anode to pressurize the anode and create a pressurized gas comprising hydrogen and other gases present in the anode at fuel cell system start-up;

monitoring an anode pressure;

opening an anode flow valve to release the pressurized gas in the anode in a fast flush;

determining if the anode pressure exceeded an anode pressure threshold;

enabling anode flow set point detection after a first predetermined time if the anode pressure exceeded the anode pressure threshold;

closing the anode flow valve when a boundary condition is exceeded if the anode pressure does not exceed the anode pressure threshold;

monitoring an anode flow set point using the anode flow set point detection;

determining if the anode flow set point exceeds an anode flow set point threshold;

closing the anode flow valve after a second predetermined time if the anode flow set point exceeds the anode flow set point threshold; and closing the anode flow valve when the boundary condition is exceeded if the anode flow set point does not exceed the anode flow set point threshold.

13. The method of claim 12 wherein the first predetermined time is up to about 2 sec.

14. The method of claim 12 wherein the second predetermined time is up to about 1 sec.

15. The method of claim 12 wherein the boundary condition comprises a third predetermined time.

16. The method of claim 15 wherein the third predetermined time is up to about 2 sec.

17. The method of claim 12 wherein the boundary condition comprises an anode volume.

18. The method of claim 17 wherein the anode volume is in a range of about 0 to about 10 anode volumes.

19. The method of claim 12 wherein the anode pressure threshold is in a range of about 140 to about 200 kPa.

20. The method of claim 12 wherein the anode flow set point threshold is in a range of about 0.1 to about 0.3 mol/s.

* * * * *